INVENTORS
DONALD A. MNICHOWICZ
RICHARD F. WACO
BY
Spencer E. Olson
ATTY.

United States Patent Office 3,480,735

Patented Nov. 25, 1969

3,480,735

COMMUNICATION SWITCHING MARKER HAVING CONTINUITY TESTING ARRANGEMENT

Donald A. Mnichowicz and Richard F. Waco, Oak Park, Ill., assignors to Automatic Electric Laboratories, Inc., a corporation of Delaware Filed Mar. 6, 1967, Ser. No. 620,879
Int. Cl. H04m 3/00
U.S. Cl. 179—18 4 Claims

ABSTRACT OF THE DISCLOSURE

Apparatus for testing conductor continuity of link busy testing leads which are connected to the hold conductor of the interstage links in a crosspoint switching network and are switched through a relay tree to a path selector, for selecting a path between two end terminals in the system. A potential applied to the link test leads prior to path selection provides signals at the inputs to the path selector indicative of whether the relay tree contacts are properly closed or not. An open-contact signal on any lead sets a corresponding latch circuit which, in turn, inhibits that lead and its associated link from being considered for use in a path through the switching network.

BACKGROUND OF THE INVENTION

Field of the invention

This invention relates to pathfinder arrangement for a communication switching system, and more particularly to an arrangement for detecting defective conditions in the marker for a crosspoint switching system.

Description of the prior art

There are many known communication switching systems using switching networks comprising coordinate matrices in a plurality of stages, with links interconnecting adjacent stages. The switching device at each coordinate intersection of each matrix may, for example, be contacts of a crossbar switch, or contacts of an individual crosspoint relay. One of the link conductors connected via the crosspoint switching contacts is usually a hold conductor to which, in an established path through the network, a relay winding at each stage is connected to hold the connection. However, before a connection can be established, it is necessary to find idle links which may be used in the desired connection. Since a holding potential appears on the hold conductor of each link in an established connection, the presence of this potential may be used as an indication that a link is busy. A marker is provided with a path testing arrangement to test for this busy indicating potential. For any given connection there are only a given number of links of each set of interstage links which may be used. A connecting switch arrangement is usually provided to select these given links and connect them to the path testing arrangement.

One specific example in a crossbar switching arrangement is U.S. Pat. No. 2,674,657 for a "Primary-Secondary-Spread Crossbar Telephone System" by J. I. Bellamy et al. In that system the hold conductor is designated a sleeve lead to which a hold magnet in each switching stage is connected in parallel, there being ground potential on the sleeve conductor of each busy link. A separate crossbar switch is provided to connect the sleeve conductors which may be used in a possible path to a controller having link test relays. The connecting switch also connects a link battery resistor to each of these sleeve conductors to provide a negative potential which operates each link test relay connected to an idle sleeve lead.

A crosspoint relay type system is disclosed in U.S. Pat. No. 3,170,041 by K. K. Spellnes for a "Communication Switching System." Several other patent applications relating to the same system are identified in the Spellnes patent in columns 33–35. In this system each crosspoint relay has an operate winding and a hold winding. The hold windings are each in series with a set of contacts at the same crosspoint, and are connected in series through the successive stages, so that in a busy path an interstage link has a potential produced by the holding current, and for an idle link there is no potential on the hold conductor. Connect relay trees are provided to connect the hold conductors of the possible links for a path to a path testing arrangement. In this system a contact in the relay tree failing to operate will provide an indication of no potential to the path testing arrangement even though the link might be busy, with the consequence that a busy link may be selected for use in a connection.

A system using the same type of crosspoint relays as used in the Spellnes system is disclosed in U.S. Pat. No. 3,349,189 by J. G. Van Bose entitled "Controlling Path Selection" and assigned to the assignee of the present application. In that system a potential is permanently connected through a high value resistor to the hold conductor of each interstage link, and the path testing arrangement is provided with detectors to discriminate between an open circuit condition due to a contact failure in the connect relay tree, and the potential existing on an idle link. A separate detector is used to test for the idle-indicating potential on an available link, or the busy-indicating potential produced by the hold current in an established path.

Still another system using crosspoint relays of the type used in the Spellnes system is disclosed in U.S. Pat. No. 3,413,421 by A. S. Cochran et al. entitled "Identifying Arrangement for Communication Switching Systems," also assigned to the assignee of the instant case. In the marker arrangement disclosed therein, a resistor is connected to the hold conductor of each link, and during one portion of the marker cycle a potential is connected in common to all of these resistors to simulate the busy indicating potential. The links having their hold conductors connected through the connect relay tree to the path testing arrangement are all tested, and lack of the potential at the pathfinder indicates a defective contact in the connect circuits. This condition, when found, is forwarded to a trouble recorder. If the idle indicating potential is found on all of the inputs of the pathfinding arrangement, the marker then proceeds through its sequences and at another part of the cycle scans the links to find one not having the hold current potential thereon.

It will be noted that in all of the above systems that an open contact in the connect switch for connecting a set of link hold conductors to a path finding arrangement introduces a problem of avoiding false selection of a busy link, and of isolating the fault for maintenance purposes.

SUMMARY OF THE INVENTION

One object of this invention is to test for proper connection of the link hold conductors to the set of path testing leads at the input of the pathfinder arrangement, if a defective condition exists to mark appropriately, and to then prevent selection of a link via an accordingly marked test lead.

Another object of the invention is to provide an arrangement to cut short the marker cycle upon detection of the fact that none of the input test leads of a pathfinding arrangement are connected, as caused for example by failure of a relay to operate, thereby saving precious marker time, and making it at once available for attempts to establish other connections.

According to the invention, the input test leads of a pathfinding arrangement are connected through a relay tree to the given links between two stages which may be used for a call being served by the marker, and during a given portion of the marker cycle a potential is connected through resistors to the hold conductors of all of the links between the two stages, and the pathfinding arrangement then scans to verify that the potential is present on all of the input test leads, as in said Cochran et al. application. A novel feature of the invention resides in an arrangement which, in response to detection of absence of the marking potential on a test lead, a latching circuit is set to apply a busy indicating potential to a conductor coupled to that test lead; and during a subsequent portion of the marker cycle, when the negative potential has been disconnected from the hold conductors of the links, the pathfinding arrangement again scans to find a link having absence of the busy indicating potential produced by the hold current of a path in use, links marked by said latch circuits also being passed over by the path testing arrangement as not available.

Another feature of the invention, operative during that portion of the marker cycle in which the potential simulating the busy condition is applied through resistors to the link hold conductors, resides in an arrangement which responds to the absence of the marking potential on all of the input test leads of the pathfinder, and immediately interrupts the marker cycle. In such a situation the pathfinder is not connected to any links, and therefore cannot perform its function on that call. The condition may be forwarded to a trouble recorder, and the marker immediately released for use in attempting to set up a connection for another call.

Other objects and features of this invention and the manner of attaining them will become more apparent, and the invention itself will be better understood from the following description of a preferred embodiment of the invention taken in conjunction with the accompanying drawings, wherein:

FIG. 1 is a block diagram of a marker controlled switching unit;

FIGS. 2–4 comprise a functional block and schematic diagram of a part of the apparatus of FIG. 1;

DESCRIPTION OF THE PREFERRED EMBODIMENT

The group selector

Figure 1:
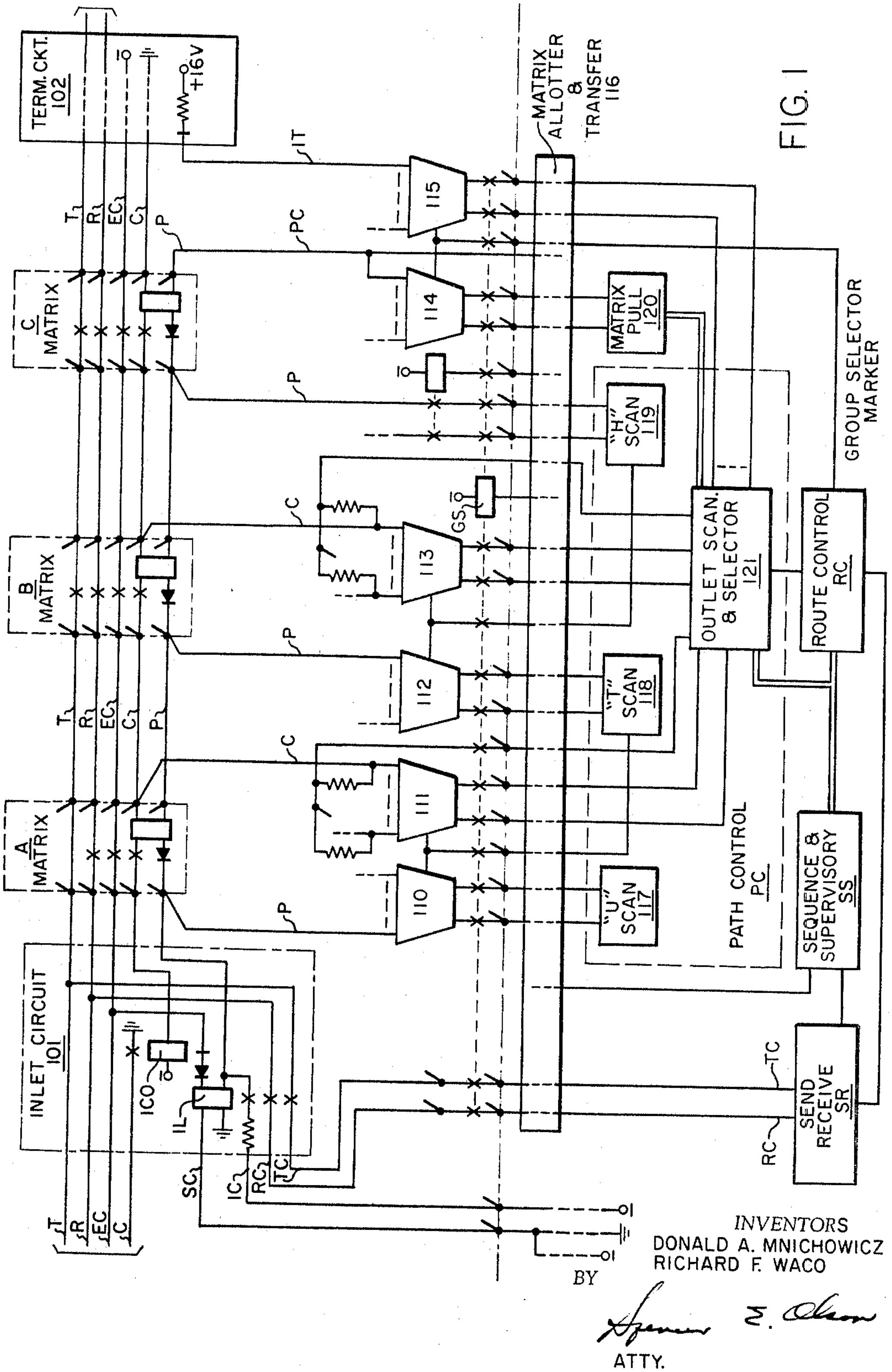
Figure 2:
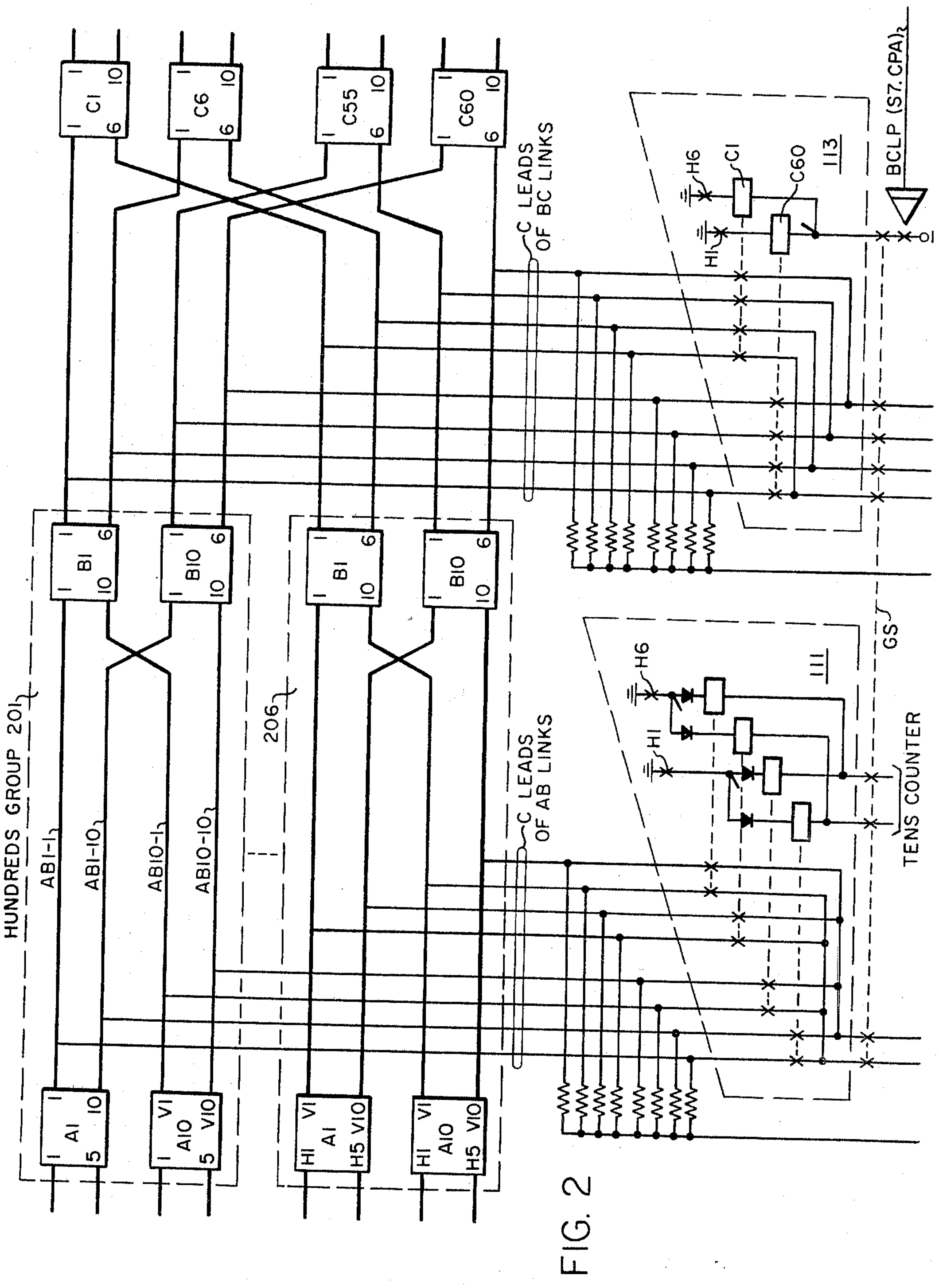
FIGS. 2–4 are to be arranged.
Figure 3:
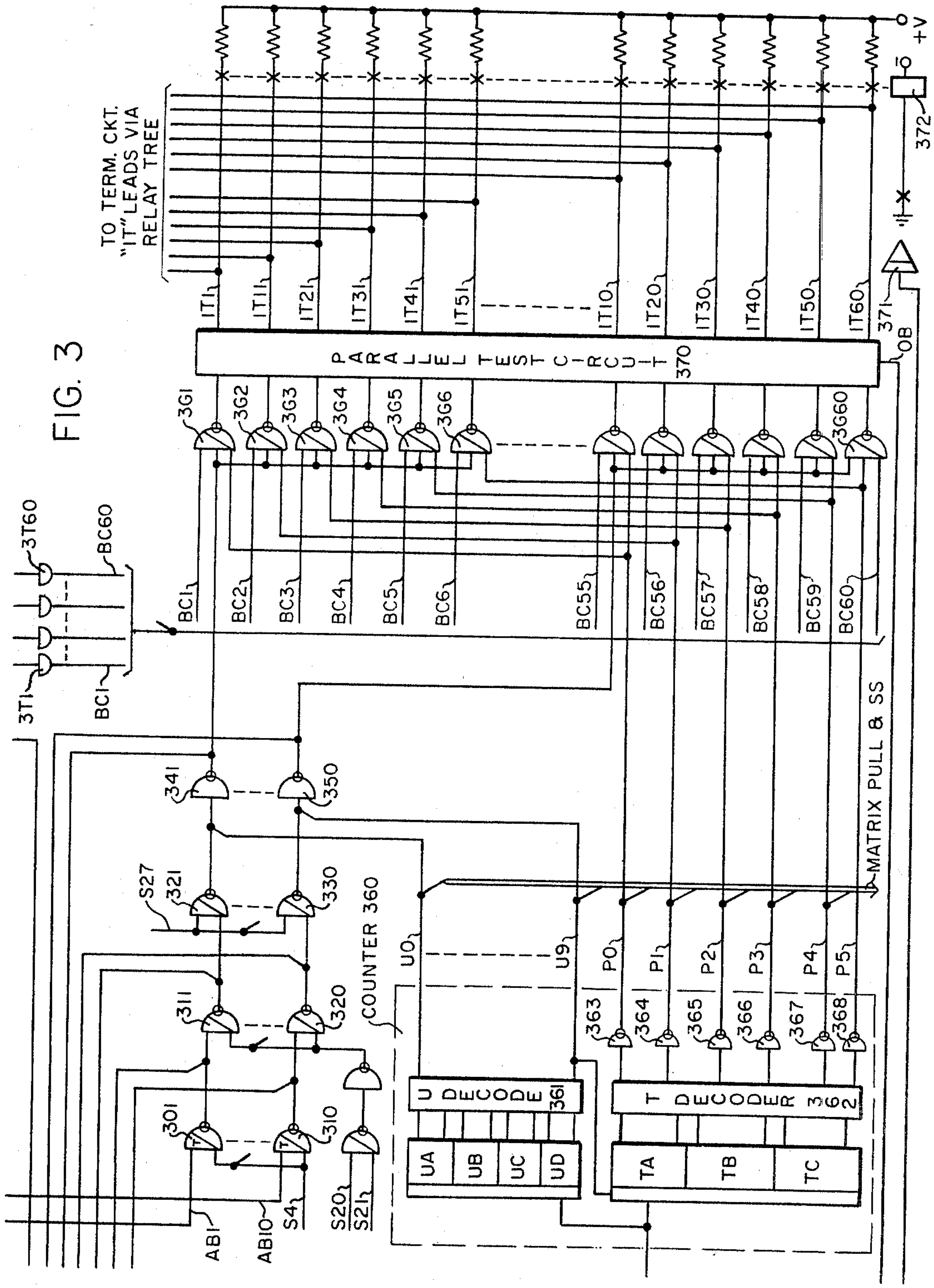

In keeping with the usual practice with systems of this type employing large numbers of identical circuit components and/or subsystems, only a number thereof sufficient for an understanding of the invention have been illustrated in the drawings. For example, FIG. 1 shows only one inlet circuit, one crosspoint of each matrix stage and one outlet circuit, it being understood however, that the complete switching circuit comprises a plurality of each. In situations where it is useful to the understanding of the operation to indicate the interconnection of a given plurality of components or subsystems, only the first and last components or subsystems in the group are shown, a dotted line between them indicating that there are additional identical components or subsystems in the group, and the difference between the reference numerals used on the first and last in the group indicate the number in the group. For example, FIG. 3, the numerals 341 and 350 applied to the two illustrated inverters indicate that there are ten identical inverters in the group, and in the specification the ten will be referred to as "inverters 341 to 350."

FIG. 1 of the drawings shows in a block diagram, a switching unit, such as a group selector GS, described in U.S. Pat. No. 3,170,041 to K. K. Spellnes and in Klees et al. application Ser. No. 414,174, filed Nov. 27, 1964, for "Arrangements in a Communication Switching System" comprising a switching network for making connections between calling side terminals or inlets and called side terminals or outlets. As shown in the Spellnes and the Klees et al. disclosures, as many as ten group selector switching units are served by two markers, each marker normally service five group selector units. A matrix allotter and transfer circuit 116 controls the connection of the markers to the switching units. A portion of one switching unit is shown at the top of FIG. 1, and one marker is shown below the allotter and transfer circuit. Each switching unit has its own connect circuit comprising relay trees 110–115 to connect the switching matrices to the marker. In each switching unit, three stages of crosspoint switches are provided of which one crosspoint in each is shown. The first stage, the A stage, contains sixty cards of fifty crosspoints, each arranged in a 5 x 10 matrix; thereby providing three hundred inputs, each associated with its respective inlet circuit and six hundred outlets or links (one hundred for each of the six "hundreds" group) appearing as inlets to the second stage, the B stage. The B stage contains sixty cards of sixty crosspoints each, in a 10 x 6 matrix, having three hundred sixty outlets or links (sixty for each of the six "hundreds" group) appearing as inlets to the third stage, the C stage. The C stage, uses a basic arrangement of sixty crosspoints in a 6 x 10 matrix with six hundred outlets connected to the respective terminating circuits. The switching stages are arranged in such a manner that each inlet circuit is associated with ten AB links and sixty BC links, to provide sixty paths for possible at random connections from any inlet circuit to any outlet circuit.

The marker is an essentially electronic unit which controls the operation of the group selector. The marker has control of all crosspoints in the group selector and sets up calls on a one-at-a-time basis. The marker operates in response to selection digits received electronically in its send receive circuit SR. The sequence and supervisory circuit SS provides thirty-one states or marker function periods for a sequenced control for all group selector circuits and a common supervisory logic for all marker circuits. In its idle state, the marker is ready to recognize a call for service at any group selector inlet. When a call-for-service mark is received, the marker connects the calling group to the marker, identifies the inlet demanding service, and connects its send-receive circuit to said inlet. While the routing digits are received in high speed code by the send-receive circuit, the marker operates connect reed relays in the trees 110–115 to the path control circuit PC to determine the link availability from the demanding inlet in the A stage toward the outlets through the B and C stages. The received routing digits are extended to the route control circuit RC for connecting a group of idle test leads of the selected group of terminating circuits or trunks. The link availability is combined with the outlet idle leads such that an idle outlet can appear idle on if an appropriate idle link to the particular inlet exists. When an idle outlet and path is found, the marker pulls the proper group of selector crosspoints, and marks the selected outlet busy.

The switching network is of the type covered in Esperseth et al. Pat. 3,275,752. Each crosspoint relay has an operate or pull winding in series with a diode, a hold winding in series with one set of its make contacts and three additional make contact sets. The relays are connected in series through the three stages via the interstage links, the pull windings via P leads, the hold windings via C leads, and respective contact sets to T, R and EC leads of the links. To establish a path the marker applies a negative potential to an A stage inlet and ground potential to a C stage outlet which operates one relay in each stage in the series path. The path holds via negative potential in the inlet circuit through the cut-off relay ICO, the hold winding of the three crosspoint relays in series, to ground in the terminating circuit 102. Note that the busy path thus has negative potential on the C lead of each link used, while idle links have an open circuit. This potential on the C lead is used by the marker for path testing. The P lead, in addition to its operate function, is also used to detect a service request signal and identify an inlet via high resistance circuits.

Connect circuit

Each group selector unit is associated with a connect circuit which includes relay means GS activated by the allotter to connect the unit to the marker and relay trees 110–115 to connect the links and terminals via relay contacts GS and transfer contacts in circuit 116. The matrix allotter and transfer circuit 116 recognizes a call-for-service signal and by extending an operating potential energizes a plurality of reed relays to connect the particular connect circuit and its associated matrix group to the marker. In the interest of simplicity, relay GS is shown in FIG. 1 as having a plurality of contacts; however, since each reed relay used in the present system comprises a maximum of ten sets of contacts a plurality of reed relays are provided. Trapezoids 110–115 shown in FIG. 1 represent relay trees. Each relay tree is capable, by energizing certain relays, of switching leads to a matrix card or a plurality of matrix cards for determining a possible path between the inlet circuit requesting service and the outlet or terminating circuit.

As an example, hundreds scanner 119 extends operating potential to relays in relay tree 112 for switching ten P leads out of six hundred from the B matrix to the tens scanner 118. It also extends an operate potential to a plurality of relays for switching sixty C leads to the pathfinder for determining available paths through the matrix, and an operate potential to relays in the relay tree 110. Relay trees 110, 111 and 114, 115 operate in a similar manner, each being equipped with the appropriate number of relays to provide the required number of contact sets. It will be noted that relay trees 111 and 113 connect the C leads of the AB links and BC links, respectively, to the marker for path testing, the potential on the C lead being negative if the link is busy, and open if the link is idle. If a set of contacts in these relay trees fails to close, a busy link could appear to be idle.

The equipment provided in the system of this type must be and is extremely reliable. However, there exists a possibility that for some reason one or more reed relay contacts may not operate or a particular relay may not be energized. Without a special provision, a malfunction of this type in the system cannot be detected immediately but only in the final stages of the connections. Since each marker is associated with more than one group selector unit, usually five, and serves one call at a time, a malfunction should preferably be detected in the early stages of the connection cycle.

The present invention, by the use of latch circuits and the associated circuits, provides the group selector marker with a signal to abandon the call under process early in the cycle, if due to the malfunction a connection cannot be established, or marks faulty contacts busy so as to exclude them from being considered as available paths.

A description of the logic notation, and schematics of typical gates, flip-flops, relay drivers, etc., used in the description to follow may be found in U.S. Pat. No. 3,293,368 to W. R. Wedmore.

Figures 4, 6:
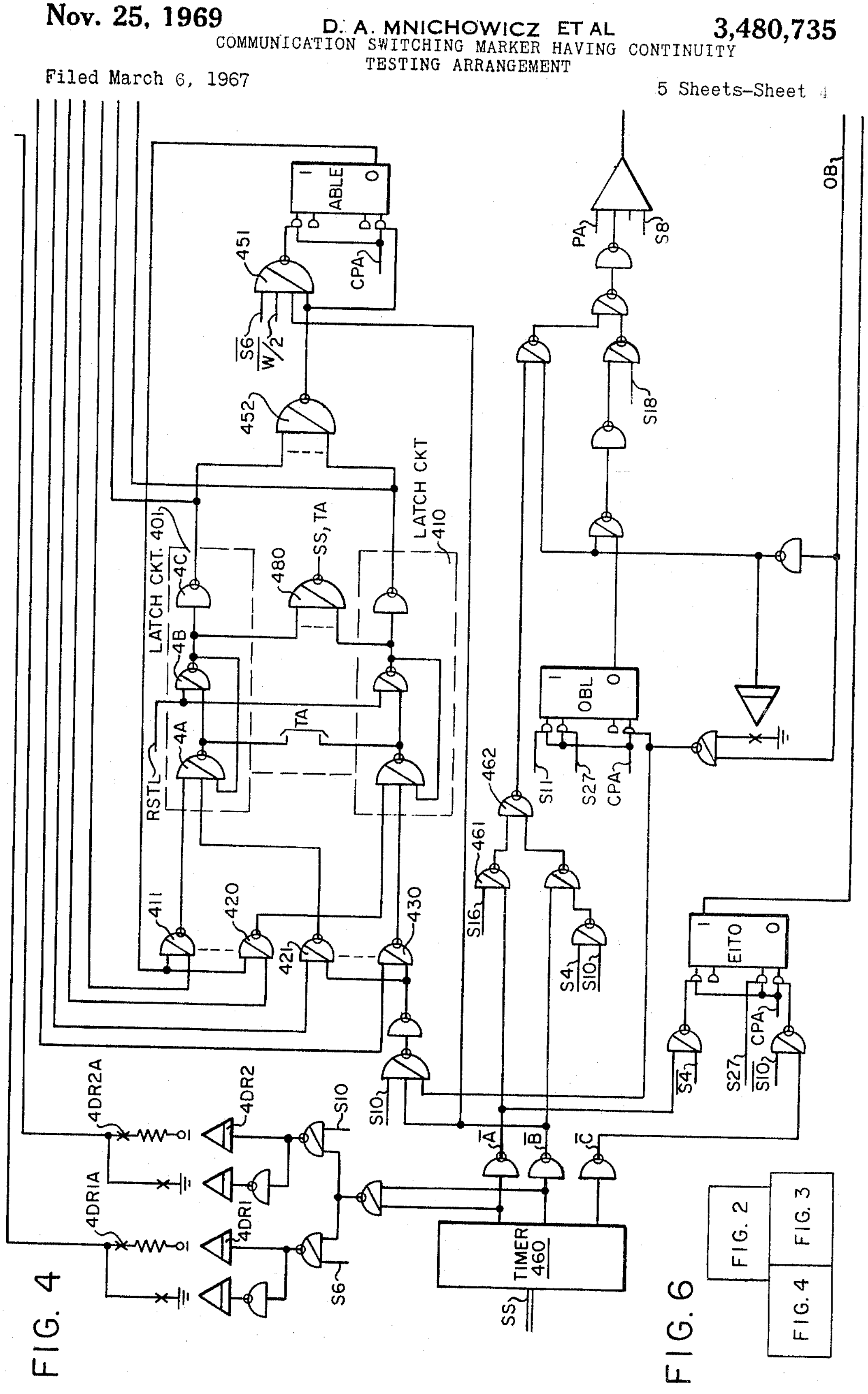
FIG. 6 shows how

In FIG. 4 of the drawings there are shown latch circuits 401–410 and their associated circuits. The outputs of these circuits can be at one of the two levels. The first level is usually −8 volts, although other negative values may be used, and represents the binary "1," or true condition. The second level, ground potential, represents the binary "0" or false condition. In a reset state the output from each latch circuit is at its true condition, and becomes false if the latch circuit is set.

Each latch circuit comprises "NOR" gates 4A and 4B and an inverter 4C. Gates 4A and 4B are in a back-to-back arrangement, such that if gate 4A is set by a signal from gates 411–420 or gates 431–440, gate 4B having its output connected to the input of gate 4A will hold gate 4A set when the initial set signal is removed from the input to gate 4A. A signal on lead RSTL at the input of each gate 4B provides a reset command for all latch circuits. The output from each gate 4A is also routed via conductor group TA, through the test and access circuit to the common supervisory control unit for indicating malfunctions. Outputs from gate 4B via gate 480, when all latch circuits are set, supply the marker with instruction to abandon the call process because the connection cannot be satisfactorily completed; whereupon the marker proceeds to serve other calls.

Operation of group selector

Figure 5:
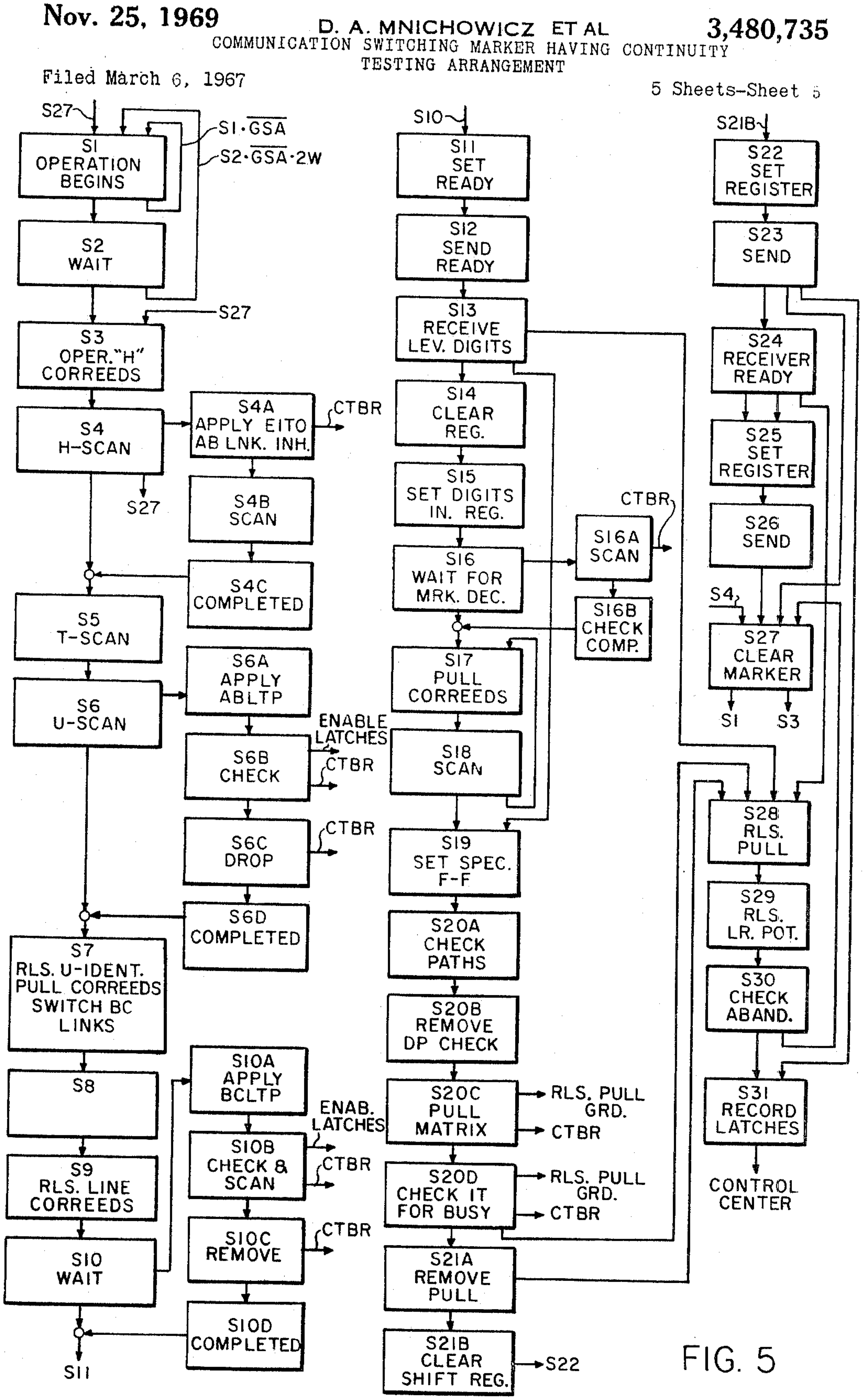
FIG. 5 is a sequence flow chart of the switching unit.

As stated above, the sequence and supervisory circuit SS of the marker provides thirty-one sequence states or time periods, to allow sufficient operating time for each function of the marker. In FIG. 5 of the drawings, there is shown a sequence flow chart indicating the function for each of these states.

When there are no call requests waiting to be served, the sequence normally remains in state S1. When a call-for-service signal appears, allotter 116 selects the particular group selector unit, connects it to the marker via relay means GS, and locks out all other selector units. During state S2, the allotter is provided with a wait interval. When an allotter is locked to the selected group selector, the marker advances to the state S3. During state S3 vertical P leads of the C matrix are connected to the hundreds scanner 119, the marked advances to state S4. Signal S4 actuates the hundreds scanner. When the hundreds digit is identified the scanner stops, operating one of the six relays in relay tree 112, thereby connecting the matrix horizontal P leads to the tens scanner 118. Also during state S4, flip-flop E1TO is set and via relay driver 371 operates relay 372. At contacts of relay 372 a potential simulating all terminating circuits idle is applied to the idle test leads IT1–IT60. The marker then advances to state S5.

In states S5 and S6 tens and units identity of the inlet circuit is identified. Appropriate relays in the relay trees 110 and 111 are energized, thereby connecting via contacts of relay means GS, the A matrix vertical P leads to the units scanner 117, and then AB link C leads to leads AB1–AB10 to the outlet scanner and selector 121 for AB link availability testing.

Also during state S6, the AB link contact failure testing is executed. Timer 460 is initiated providing interstate function timeout. Signal S6 $(A+B)$ energizes a relay driver 4DR1 and at its contacts 4DR1A a battery potential is placed on the C leads of the six hundred AB links, simulating all links busy. This negative potential is extended via contacts of the relay tree 111 and relay means GS to leads AB1–AB10. The presence of resistance battery on leads AB1 through AB10 at the inputs of test gates 301 through 310, ground at gates 311–320, and negative potential at gates 411–420 generates a false output from gates 411–420. Thus, latch circuits 401–410 will remain in their normal reset state. Assume that because of a contact failure no potential appears on link AB1. The absence of potential to the input of gate 301 via gate 311 and gate 411 generates a true signal at the output of gate 411. A latch circuit 401 changes its output from inverter 4C from true to false. An output of latch circuit 401 is coupled with the output from gate 301 such as when the false signal appears at either output, the input to gate 311 remains false, generating a true signal at the output of inverter 341 via gates 311 and 321, marking the associated AB link busy by blocking the corresponding scanner count. As stated above, latch circuits, when they are set, remain set throughout the remainder of the connection in process.

If at this time the relay connecting the AB links to the path finder fails to operate, the associated contacts will not extend the circuit through, all the latch circuits 401–410 will set, and the outputs from gates 4B of latch circuits 401–410, extended to the input of gate 480, generate a signal to the sequence and supervisory circuit, indicating a connection from the inlet circuit to the outlet cannot be determined. Therefore, the marker abandons the call in process and advances to state S1 to begin servicing another call if one exists.

However, in the call being described, it is assumed that only lead AB1 has detected a contact failure and operated its latch circuit. In sequence state S7, sixty BC links are connected to the path selector and the identity of the inlet circuit is released. In state S8 the potential is applied to hold the line relay of the inlet circuit. In states S9 and S10, various wait periods are provided and functions performed, such as breaking the upper winding of a line relay, state S9, and clear code receiver shift register, state S10.

When the marker advances to state S10, timer 460 is initiated, providing interstate function time-outs, and the BC link contact failure is executfed. Signal S10 $(A+B)$ energizes relay driver 4DR2 and at the contacts 4DR2A a negative potential is placed on the C leads of all three hundred sixty of the BC links, simulating all BC links busy. This negative potential is extended via contacts of relay tree 113 and relay means GS1 to test gates 3T1–3T60. The presence of negative potential at the input to test gates 3T1–3T60 generates a false signal output from each test gate 3T1–3T60 and via inverters 3I1–3I60 to inhibit gates 3G1–3G60.

The simulated link busy outputs from gates 3G1–3G60, and from idle test leads IT1–IT60, via contact of relay 372, simulating all terminating circuits idle, are routed to the parallel test circuit 370. Parallel test circuit 370, which may be of the type disclosed in U.S. Pat 3,219,478, tests for a match between an available link and an available outlet. An electronic counter 360 is provided to scan the sixty paths one at a time. The counter comprises flip-flops UA–UD and the associated units decoder 361 supplying signals U0–U9, and flip-flops TA–TC and associated tens decoder 362 supplying signals T0–T5. Counter 360 is initiated by a command signal PA OB S10 B) to start enabling gates 3G1–3G60 one at a time. If no contact failure exists, the counter after completing one cycle of operation generates a signal to the sequence and supervisory circuit SS to advance to state S11.

Assume that a contact failure exists on link BC1 and BC55. When the counter 360 enables gate 3G1, a match is found between the idle test lead IT1 and the output from gate 3G2. Signal on lead OB from the parallel test circuit 370 becomes false, stopping counter 360 with a true signal appearing on lead UO from the units decoder and the true signal on lead TO from the tens decoder. Since units decoder outputs are coupled with the outputs from latch circuit 401–410, a true signal on lead UO via inverter 341 and gate 421 sets latch circuit 401. The output from latch circuit 401 via gates 311 and 321 generates a false input to the inverter 341, thus inhibiting gate 3G1, because a match between the output from gate 3G1 and idle test lead IT1 is lost, the output from parallel circuit 370 on lead OB becomes false allowing counter 360 to resume scanning. When counter 360 enables gate 3G55, signals on leads U9 and TO become true, and the signal on lead OB becomes false, again momentarily stopping counter 360. True signal on lead U9 via inverter 350 and gate 430 sets latch circuit 410, thereby inhibiting gate 3G55 by a signal extended from the output of latch circuit 410, gates 320, 330 and inverter 350. Loss of coincidence between the output from gate 3G55 and idle test lead IT10 generates a true signal on lead OB, causing the counter 360 to resume scanning of the remaining gates. When timer 460 advances to its following function period, a resistance potential from the BC links is removed and counter 360 is stopped. Signal (S10 C) resets flip-flop E1TO thus removing the idle simulating potential from idle test leads IT1–IT60 by restoring relay 372. The marker then davances to sequence state S11.

If during the BC link contact failure testing all latch circuits are stopped, a signal from the output of gate 480 instructs the marker to abandon the call in process and to resume processing other calls requesting service.

During states S11–S27 the marker performs functions to complete the connections as described in the abovementioned Klees et al., application.

From the foregoing description it can be seen that the desired speed in selecting an idle link, for connecting the two end terminals in the switching system, is achieved by electronically modifying the condition of links and "blanking-out" the corresponding scanner count of a link if its connect relay contact fails.

Also prior to link selection, link test leads are checked for proper contact closures of the selected relays in the connect circuit. A defective contact is detected and the particular link marked busy by the associated latch circuit, to prevent a possible double connection on the busy link. And, in the event of a connect relay failure a signal is generated to stop the establishment of a connection early in the cycle of the marker and to instruct a marker to return to its idle state. Connections for other inlet circuits requesting service can be initiated without further delay.

While the present invention has been described with respect to a particular embodiment, this description is intended in no way to limit the scope of the invention.

What is claimed is:

1. In a communication switching system operative to establish connections between a first set of terminals and a second set of terminals through a plurality of switching stages arranged in tandem between terminals of the first set and terminals of the second set, each of said stages having a plurality of relays arranged in coordinate arrays, each relay including a hold winding, with a normally open set of its own contacts connected in series with its hold winding, links interconnecting adjacent stages, each including a hold conductor interconnecting the series combination of the hold winding and normally open contacts of a relay in each of the adjacent stages, busy links having the hold path contacts closed at each end and having holding current flowing through the hold windings to cause a given potential to appear on the hold conductor, each of said switching stages having a set of link test leads connected to a respective hold conductor and means for selecting a group of possible links for a given connection and for connecting the link test leads thereof to individual inputs of respective detectors in a path selector, said detectors having a first signal condition at their outputs in response to an open link and a second signal condition at their outputs in response to said potential on said links; a pathfinder arrangement comprising:

means for applying negative potential to the link test leads of one set of said links, to provide, via the selected link test leads connected by said connecting means to said respective individual detectors for that set, signals alternatively of said first and second condition at the output of each detector representative respectively of the discontinuity and continuity through said connecting means of the corresponding test leads;

a plurality of latching circuits each having a common resetting means, a controlled input from said corresponding detector circuits and an output connected to said associated detector outputs, said latching circuits when in their reset state each having said first signal condition at their outputs, each said latching circuit being set responsive to said first signal condition from the corresponding outputs of said detector circuits to said controlled inputs to change the latching circuit output to said second signal condition, thereby marking said link associated with said detector busy; and scanning means operated to scan the outputs of said detectors to select an idle one of the links of said set, selection of any links connected to a detector having the corresponding latch circuits set being prevented by said busy marking condition.

2. The pathfinder arrangement according to claim 1 further including an arrangement for testing link test leads for the succeeding set of interstage links comprising:

means for applying negative potential to the link test leads of said succeeding set to each selected plurality of leads connected by said corresponding connecting means to said respective individual detectors, providing at the output of said detectors signals of said first and second condition, said signals being representative of the discontinuity and continuity, respectively, of the testing lead on each of said possible leads;

a coincidence checking means comprising a number of coincidence gates equal to the number of detector outputs in said succeeding set of interstage links, each gate having an input which shows the continuity-discontinuity condition of said link test leads, via one of said detectors and an input for a corresponding state of the scanning means;

first and second plurality of connecting means connecting respective outputs of said scanning means, each output normally being at said second signal condition, to a corresponding coincidence gate via a respective signal inverter;

a source of pulses operative to step the scanning means to enable the coincidence gates in turn one at a time;

a plurality of idle test leads from said second set of terminals, means for applying another potential to said idle test leads to simulate idle condition of said second set of terminals; and a parallel test circuit having inputs from said coincience gates, inputs from said plurality of idle test leads and a single output, said parallel test circuit generating a signal on said single output responsive to coincidence found between a link test lead having a discontinuity condition and its corresponding idle signal on said idle test lead to stop the scanning means so that the position of the scanning means corresponds to the link test lead having a discontinuity condition.

3. The pathfinder arrangement according to claim 2 wherein each of said plurality of latch circuits further includes another controlled input from a corresponding signal inverter associated with said first plurality of scanner outputs, said latch circuit output connected to the same one of said scanner outputs, said latch circuit being set in response to the inverter output signal when the scanner is stopped in its position to change the latch circuit output to said second signal condition, to thereby mark said position busy and inhibit its associated coincidence gate, whereby said parallel-test-circuit again lacks coincidence and activates the scanner to enable the remaining coincidence gates one at a time, the selection of an idle link being initiated upon completion of the continuity testing of both said link test leads to set the latch circuits.

4. The pathfinder according to claim 3 further including a gating circuit having a plurality of inputs and an output, said gating inputs connected to corresponding latch circuit outputs, said gating circuit having a first signal on its output if at least one of said latch circuits is not set, indicating the selection of an idle path can be accomplished, and a second signal on its output when all said latch circuits are set indicating that selection of an idle path cannot be accomplished; and means responsive to said second signal to discontinue processing a connection of a terminal of said first set to one of the terminals of said second set.

References Cited

UNITED STATES PATENTS 3,413,421 11/1968 Cochran et al.

KATHLEEN H. CLAFFY, Primary Examiner

W. A. HELVESTINE, Assistant Examiner